(12) United States Patent  (10) Patent No.: US 7,020,258 B2
Gill  (45) Date of Patent: Mar. 28, 2006

(54) EXPANDABLE MULTILINE DIALING APPARATUS

(75) Inventor: Keith Gill, Regina (CA)

(73) Assignee: Marketel Multiline Dialing Systems Ltd., Regina (CA)

( * ) Notice: Subject to any disclaimer, the term of this patent is extended or adjusted under 35 U.S.C. 154(b) by 300 days.

(21) Appl. No.: 10/686,485

(22) Filed: Oct. 15, 2003

(65) Prior Publication Data

US 2004/0086104 A1  May 6, 2004

(30) Foreign Application Priority Data

Oct. 15, 2002  (CA)  .................................. 2407991

(51) Int. Cl.
H04M 1/00  (2006.01)
H04M 3/42  (2006.01)
H04M 3/44  (2006.01)
H04M 3/523  (2006.01)

(52) U.S. Cl. ........................... 379/210.01; 379/216.01; 379/266.07; 379/355.03; 379/355.04

(58) Field of Classification Search ........... 379/210.01, 379/216.01, 266.07, 266.08, 355.01, 355.02, 379/355.03, 355.04
See application file for complete search history.

(56) References Cited

U.S. PATENT DOCUMENTS

| | | | |
|---|---|---|---|
| 5,155,763 A | 10/1992 | Bigus et al. | 379/111 |
| 5,185,786 A | 2/1993 | Zwick | 379/210.01 |
| 5,220,501 A | 6/1993 | Lawlor et al. | 705/40 |
| 5,297,195 A * | 3/1994 | Thorne et al. | 379/93.23 |
| 5,341,412 A | 8/1994 | Ramot et al. | 379/92.03 |
| 5,436,965 A | 7/1995 | Grossman et al. | 379/266.08 |
| 5,463,685 A * | 10/1995 | Gaechter et al. | 379/210.01 |
| 5,517,566 A * | 5/1996 | Smith et al. | 379/266.07 |
| 5,526,417 A | 6/1996 | Dezonno | 379/88.22 |
| 5,546,454 A | 8/1996 | Harrington | 379/266.01 |
| 5,553,133 A | 9/1996 | Perkins | 379/266.08 |
| 5,592,543 A * | 1/1997 | Smith et al. | 379/266.07 |
| 5,594,790 A * | 1/1997 | Curreri et al. | 379/266.07 |
| 5,621,790 A | 4/1997 | Grossman et al. | 379/266.08 |
| 6,198,814 B1 | 3/2001 | Gill | 379/266.01 |
| 6,775,378 B1 * | 8/2004 | Villena et al. | 379/266.07 |

* cited by examiner

Primary Examiner—Harry S. Hong
(74) Attorney, Agent, or Firm—Adams Evans P.A.

(57) ABSTRACT

There is disclosed an expandable multiline dialing controller which is connected to a computer hosting a database of telephone contact records. The controller is rendered expandable by a capacity expansion interface which allows the connection of second or subsequent dialing controllers in a chain, all of the dialing controllers in the chain sharing the connection to the single computer in telephone contact database. Available operators and available outside lines could be shared between the dialing controllers in the chain. A multiline dialing control system comprising a plurality of such dialing controllers is also disclosed. Also disclosed is the method of conducting a telephone contact campaign in such an expandable hardware environment.

36 Claims, 4 Drawing Sheets

FIGURE 1:

PRIOR ART

EXPANDABLE MULTILINE DIALING APPARATUS

EXPANDABLE MULTILINE DIALING APPARATUS

This invention relates to telecommunications, and more specifically deals with a multiline dialing apparatus or controller which might be used in telephone contact campaigns.

BACKGROUND

Telephone communication is a nearly universal method of communication in our society. Telephones provide a fast and efficient means for contacting someone at any time of the day or night anywhere in the country or even the world. Where large number of people need to be contacted, for example in telemarketing applications, automated outbound dialing systems are used to expedite the contacting as many people as possible by telephone in a limited time period. There are three basic components to an automated outbound dialing system. First, there is a computer in which a database containing the data records is stored. Second, there is an automated dialer into which telephone numbers are downloaded from the host computer for automated dialing and thirdly there are human operators to talk to the people contacted. In the operation of such a system, a set of telephone numbers are identified in the computer and are downloaded into the automated dialer either at the beginning of the work day or as operators are available to talk. As soon as human operators are ready to talk, the automated dialer begins dialing and proceeds to take the appropriate action as the telephone calls are answered. The appropriate action usually consists of transferring the line to a human operator.

To date, the majority of the dialing apparatus which have been used to conduct telemarketing campaigns of this type are computers equipped with dialogic boards. The dialogic board is a dialing peripheral which can be connected within or to a computer which allows for the computer to dial or answer telephone calls using an operator telephone also connected to the PC and board. Furthermore an elaborate computer network system is required.

Increased globalization in the economy, as well as increasing amounts of corporate outsourcing of customer contact functions, have led to the proliferation of telephone call centres from which telephone contact campaigns and customer service functions are conducted. These types of call centres may have tens or even hundreds of human operators, and similar numbers of incoming subscriber telephone lines, all of which are interconnected by elaborate control, dialing and recordkeeping systems. In a call centre environment such as this, the prior art approach of using computers equipped with dialogic boards to handle the majority of the dialing functions and requiring a computer in front of every operator is not practical given the numbers of telephone contacts or calls being handled as well as the physical size of the call centre and the number of human operators or sheer magnitude of the amount of telephone equipment which is involved. Generally speaking in an environment such as this, large digital telephone systems with automated dialing control systems integrated therein are the norm. Equipment such as this is costly to install and requires significant investments of time and resources in maintenance as well.

Figure 1:
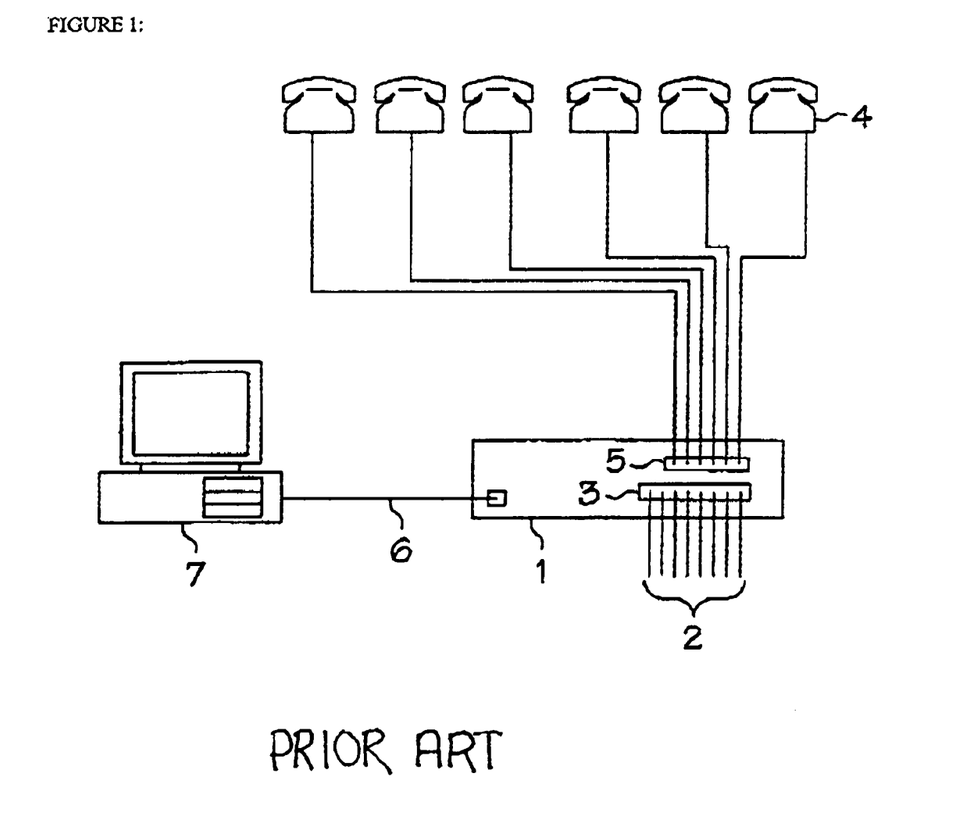
FIG. 1 is a demonstration of a prior art multiline dialing controller for use in a smaller call center environment.

Until recently these dialing control systems were basically unavailable to smaller users, since the installation and maintenance overhead on these types of systems is prohibitive for smaller to medium-sized businesses. Smaller call centres or telephone campaign operators need a more simple or straightforward dialing controller to administer telephone campaigns. One such example of a simple hardware dialing controller which can be used to administer a telephone contact campaign in a smaller environment is disclosed in U.S. patent Ser. No. 6,198,814. FIG. 1 shows one embodiment of this multiline dialing system which employs a specific hardware dialer, rather than one or more PCs with dialogic boards, attached to a server computer and a plurality of operator telephones, as well as a plurality of telco lines. The basic requirements for such a multiline dialer installation are a plurality of telephone company phone lines, which can be connected to the 'outside' half of the dialing apparatus, and then one or more internal operator stations are connected to the 'inside' half of the dialer circuitry. The remainder of the dialer hardware is then used to coordinate the dialing or answering of telephone calls on the outside telco lines and connecting those calls to operators staffing the operator stations internally connected to the dialer. One type of multiline dialing hardware which is often used in telemarketing applications is a predictive dialer. A predictive dialer is a telephone dialing system in which outbound calls are automatically placed in anticipation of telephone agents becoming available. The predictive dialer system will pace outbound telephone calls to maintain a specified target mean connection time as close as possible to those parameters specified by the system.

One major problem with the use of a multiline dialing controller such as that disclosed in the 814 patent is its commercial utility and success. The market adoption and commercial success of these types of hardware have been significant and as such many users of these types of controllers are now looking for cost-effective expansion alternatives for their businesses. In order to expand the call centre beyond, for example, the six operators which are shown in the embodiment of FIG. 1, it is necessary to install a second or additional multiline dialing controller, with the attendant number of additional outside subscriber telephone lines and operator telephone sets. Each multiline dialing controller in that invention is also connected to its own host computer which contains the dialing database for use in the administration of the telephone contact campaign in accordance with that invention. While this can certainly be done, the scalability of solutions such as this is limited. For example, the administrator of a very large telephone contact campaign would likely prefer not to administer their contact campaign using multiple multiline dialing controllers each with its own distributed copy of the dialing database, since the administration involved in maintaining accurately split copies of the dialing database or otherwise integrating the data from those multiple databases on the multiple host computers creates additional administrative overhead. Also, there may not be optimal use at all times of all of the outside subscriber telephone lines or all of the human operators on each multiline dialing controller.

It is felt that if a scalable multiline dialing controller which was expandable in sufficient size to enable its use in a medium to larger sized call centre which avoided the problem of replicated copies of the dialing database and/or allowed for the optimal use of all of the human operators and all of the outside subscriber telephone lines on the entire system, this would be an attractive hardware solution which could compete in terms of efficiency and performance with the larger dedicated digital systems now used in large sized call centres while being more economical, and providing expandability or an upgrade path for users of a more basic multiline dialing controller who might eventually find themselves requiring additional capacity on their system.

SUMMARY OF THE INVENTION

It is the object of the present invention to provide a multiline dialing controller which can be used in the administration of a telemarketing or telephone contact campaign, having the capability of a fixed number of human operators and a fixed number of outside subscriber telephone lines attached thereto and which multiline dialing controller is operatively connected to a host computer with a dialing database therein which dialing database contains information pertaining to the telephone contact campaign, which multiline dialing controller is expandable in its capacity beyond the fixed number of human operators or fixed number of outside subscriber telephone lines.

It is the further object of the present invention to provide an expandable multiline dialing controller which does not require the addition of a second or additional host computer upon an expansion of the capacity of the dialing controller itself.

It is the further object of the present invention to provide an expandable multiline dialing controller which is equipped with a fixed number of human operator capabilities and with access to a fixed number of outside subscriber telephone lines or telephone service which can be expanded by connection of that multiline dialing controller to another such multiline dialing controller, and these two or more multiline dialing controllers will share the same connection to the host computer and the dialing database.

In a further embodiment of the present invention it is the object to provide an expandable multiline dialing controller which is capable of being expanded by connection of that multiline dialing controller to one or more additional such multiline dialing controllers all of which would share the same connection to the host computer and the dialing database, and wherein telephone calls dialed by a particular dialing controller in this chain on an outside telephone line attached thereto could be shared with or connected to an operator telephone on another dialing controller in the chain.

The invention, an expandable multiline dialing controller, accomplishes its objects comprising a computer interface for connection to a computer which hosts a database of telephone contact records; a plurality of operator telephone connections, each such operator telephone connection capable of connecting an operator telephone to said multiline dialing controller; a plurality of subscriber line connections, each such subscriber line connection capable of being connected to a subscriber telephone line; and a capacity expansion interface which can be used to connect said first expandable multiline dialing controller to a second or subsequent similar expandable multiline dialing controller, wherein all said dialing controllers in the chain will communicate with a single computer and a single database of telephone contact records, the first dialing controller communicating directly with said computer via the computer interface thereon, and the second and subsequent dialing controllers communicating with the computer and the database of telephone contact records through or by virtue of the capacity expansion interfaces of the dialing controllers which are all connected, and eventually through the computer interface of the first dialing controller. Effectively the connection of a plurality of dialing controllers in this fashion is what might be referred to as "daisy chaining"

In this basic embodiment, namely by providing a dialing controller which is expandable in capacity by allowing for it to daisy chain with one or more additional multiline dialing controllers while sharing a single telephone contact record database, large orders of scalability are created with respect to this type of equipment.

More elaborate embodiments of the dialing controller or controllers of the present invention may, in addition to sharing a connection to a single host computer and telephone contact record database, actually share connectivity functions via the capacity expansion interface as well. For example, in a predictive dialing embodiment, if one of the dialing controllers had dialed a telephone call on one of its outside subscriber lines and there was no operator telephone coming open on the dialing controller to accept that call that had already been connected, that dialing controller might route that connection or connect that telephone call to an available operator telephone on another dialing controller in the chain again by way of the capacity expansion interface connection between the dialing controllers. Similarly or conversely, where an operator telephone became available on one dialing controller in the chain, that controller might by way of the capacity expansion interface seek out a connected call on a subscriber line on another dialing controller if there were no telephone calls currently connected and awaiting an operator on the subscriber lines of that particular dialing controller. This would allow for optimal use of all of the operator telephones and all of the outside subscriber lines of the chain of dialing controllers of the present invention.

The capacity expansion interface might be a standard digital signal interface between the dialing controllers in the chain, where the hardware of the individual dialing controllers handled telephone calls digitally as well. It will be understood that the present invention could also be deployed in an analog environment, although the development of the particular capacity expansion interface would potentially be more complex in its manufacture.

In addition to accomplishing its objects by providing for an expandable multiline dialing controller which can be expanded by provision of a dialer expansion interface allowing the interconnection of a plurality of such dialing controllers, another embodiment of the invention enabled by this disclosure and intended to be covered by the scope hereof would be an expanded multiline dialing control system comprising a plurality of multiline dialing controllers operatively connected to each other and sharing a connection to a single host computer containing a database of telephone contact records. Each dialing controller would be connected to a plurality of operator telephones and a plurality of subscriber telephone lines and each dialing controller would receive instructions from the host computer regarding the dialing of telephone calls on the subscriber telephone lines connected thereto. Upon dialing a telephone call on such subscriber line or lines the dialing controllers would connect those telephone calls either to available operator telephones on the same dialing controller or by way of seeking out within the system an available operator telephone on another dialing controller in the chain and connecting the telephone call to that operator telephone.

In addition to the hardware of the present invention, there is also disclosed a method of optimizing the performance of the telephone contact campaign using multiple multiline dialing controllers connected to a single contact database, by daisy chaining the multiline dialing controllers for connection to the single computer and database. As outlined with respect to the hardware herein, the method might also be enhanced by allowing the dialing controllers in this chain arrangement to share the connection of operator telephones and subscriber lines between controllers in the chain where appropriate.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labelled with like numbers, and where:

DETAILED DESCRIPTION OF THE ILLUSTRATED EMBODIMENTS

One type of a specific hardware dialer system which avoids many of the complexities and cost considerations associated with the establishment of a call centre system using the dialogic board method outlined above is outlined in FIG. 1 hereto. The dialer system shown in FIG. 1 includes a central computer 7 in which a central database of telephone numbers and other calling data would be contained, which is operatively connected to a multiline dialing controller 1P. The multiline dialing controller 1P of FIG. 1 is connected to eight outside subscriber service lines 2 using subscriber line ports 3. In this particular case, six standard telephones, being the operator telephones 4, are connected to the multiline dialing controller 1P at operator telephone ports 5. This type of dialing controller is designed for rapid installation in the North American telemarketing environment, insofar as the only steps that are required to get the dialing hardware connected for running are to connect the subscriber telephone lines as delivered by the telco to the site to the dialing controller using the standard RJ11/14 jacks or plugs provided thereon, and similarly to connect the operator telephones to the dialing controller as well. The only other steps involved in getting that particular dialing controller operating would be to install the necessary software on the computer and establish communications between the computer and the dialing controller. Market acceptance of this type of dialing control hardware has been dated.

As outlined above, it is the object of the present invention to provide an expandable or scalable multiline dialing controller which is in its more basic embodiments similar to that demonstrated in FIG. 1, but which can be expanded in its capacity by connection of that controller to an additional dialing controller or dialing controllers in a chain, while sharing the same connection to a single contact record database.

Figure 2:
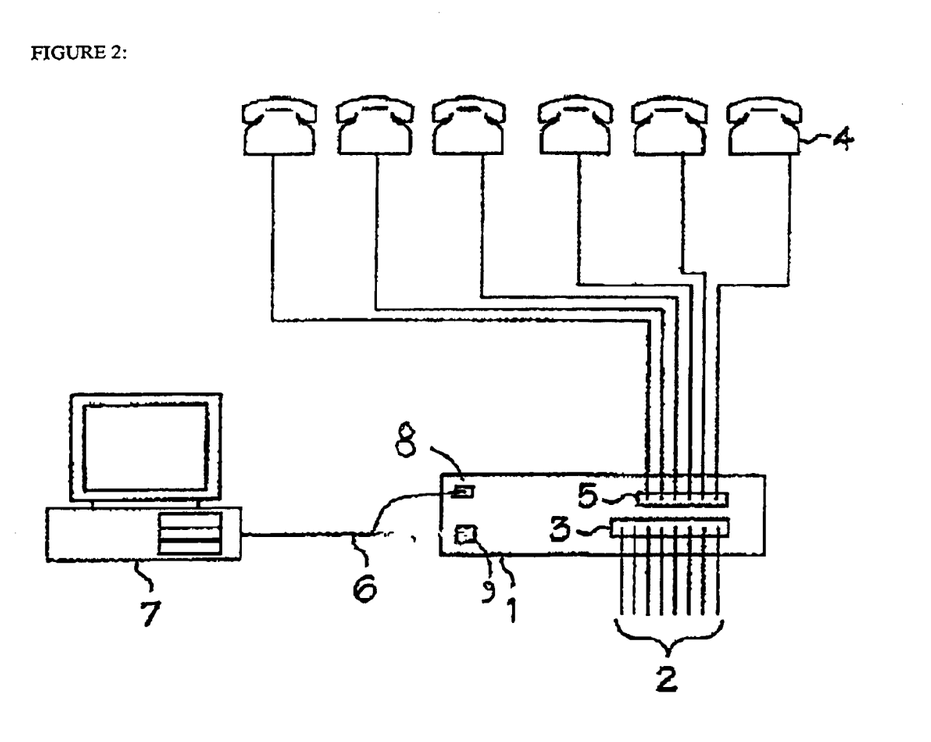
FIG. 2 shows a basic embodiment of the expandable multiline dialing controller of the present invention.

FIG. 2 demonstrates an expandable dialing controller in accordance with the present invention which is effectively a modified version of the controller of FIG. 1. There is shown in the expandable dialing controller of FIG. 2 a database interface 8 which can be connected to a central computer 7 which contains a central database of telephone contact records to be used in the conduct of the telephone contact campaign. There are also showed a plurality of outside subscriber service line connections 2. Each of the outside subscriber service line connections 2 is capable of connection to an outside subscriber service line 2 on which telephone calls can be dialed or connected, or conducted.

Shown next in the embodiment of FIG. 2 is a plurality of operator device connections 5, each of which enables the connection of an operator device 4 set to the expandable dialing controller 1 of the present invention. As in the case of the dialing controller of FIG. 1, the basic concept of this controller is that the controller upon receipt of telephone dialing information from the central computer 7 and the central database of telephone contact records stored therein will dial telephone calls on the outside subscriber service lines 2 and connect those calls to available operators on operator devices 4 connected to the operator telephone connections of the controller. As an operator completes a call and hangs up their operator telephone, the dialing controller will complete the dialing of another telephone call on a free outside subscriber telephone line and connect the next telephone call back to the free operator handset.

Shown also in FIG. 2 is the dialer expansion interface 9. The dialer expansion interface 9 is a signal or data connection which can be used to connect a second or subsequent expandable dialing controller 1 to the first expandable dialing controller 1 in a chain arrangement.

The second or subsequent expandable dialing controllers 1 in the chain will not be connected to their own central computers 7 and separate contact databases, but rather will share instructions or will instead receive their dialing instructions from the single central computer 7 and single telephone contact record central database operatively connected to the first expandable dialing controller 1 in the chain.

It will be understood the particular communication protocol or nature of the dialer expansion interface 9 is immaterial as long as it is capable of achieving the result of communication between the expandable dialing controllers 1 in the chain and the central computer 7 connected to the first dialing expandable multiline controller 1. It is contemplated that the connection might be a digital computer interface, but it will be understood that all such variations in terms of the nature or protocol of such communication or connection as abilities to one skilled in the art are contemplated within the scope of the present invention.

Figure 3:
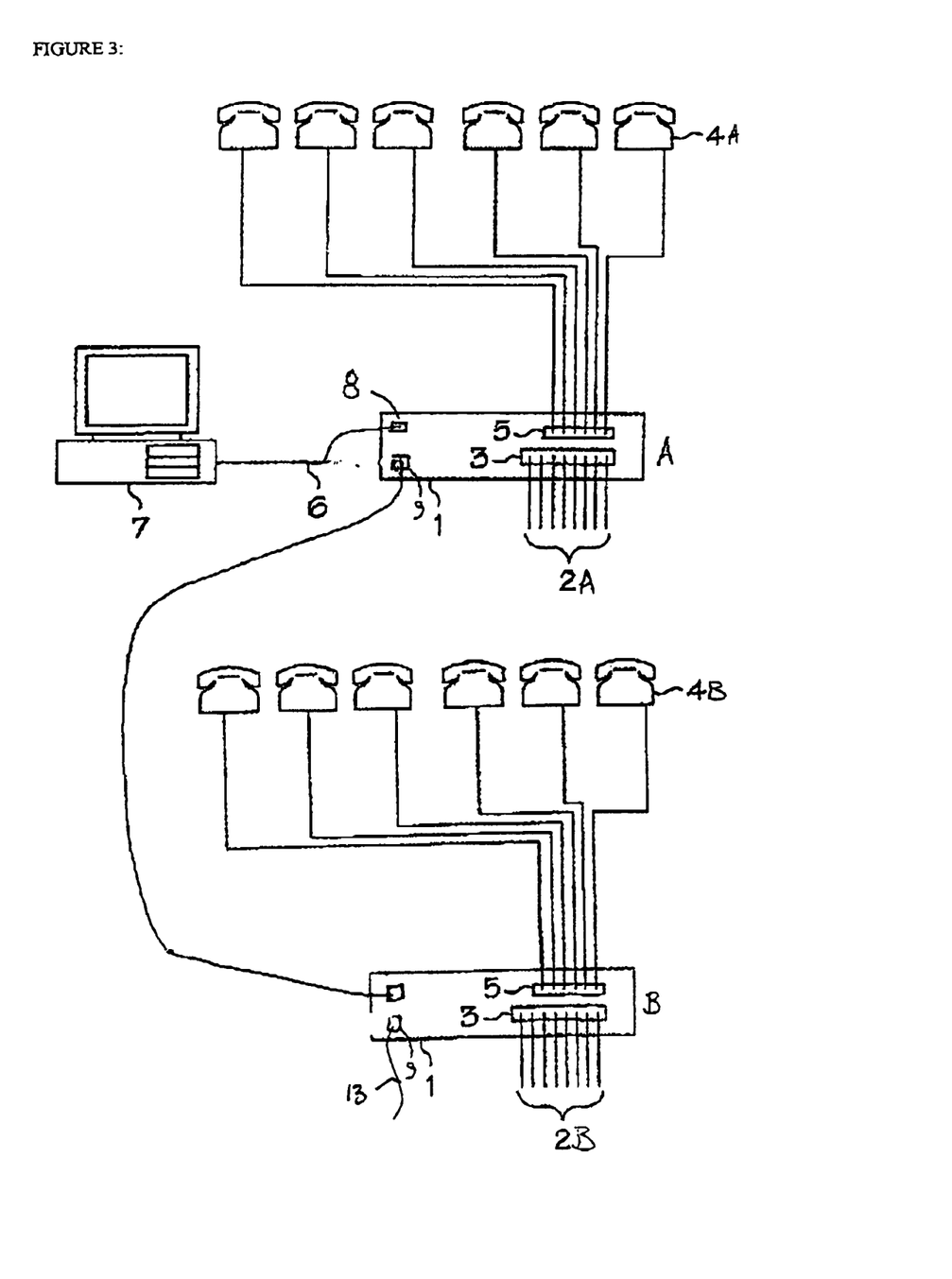
FIG. 3 shows two multiline dialing controllers of the present invention operatively connected to the same host computer and central database of telephone contact records.

FIG. 3 shows two of the expandable dialing controllers 1 of the present invention operatively connected to each other by a cable passing between their respective capacity expansion interfaces 9, with a single central computer 7 with a central database attached to the first dialing controller (A) in the chain. In this embodiment, it is contemplated that the connection 9 between the expandable dialing controllers 1 would effectively be a data pass-through from the connection between the central computer 7 and the first expandable dialing controller (A). Connection 13 illustrates where another expanable dialing controller 1 could be connected to form a chain of serially linked dialing controllers. Each of the expandable dialing controllers 1 in the chain would signal the central computer 7 when a call is completed and information was required to effect the dialing or connection of another telephone call on a free outside subscriber service line 2, the first dialing controller (A) in the chain communicating directly with the central computer 7 via its database interface 8 and the second and subsequent dialing controllers in the chain communicating with the central computer 7 by passing their data requests and receiving data from the central computer 7 through first the connection between the first dialing controller A and the central computer 7 and then the subsequent connections between the expandable dialing controllers 1 in the chain by way of their respective capacity expansion interfaces 9.

Figure 4:
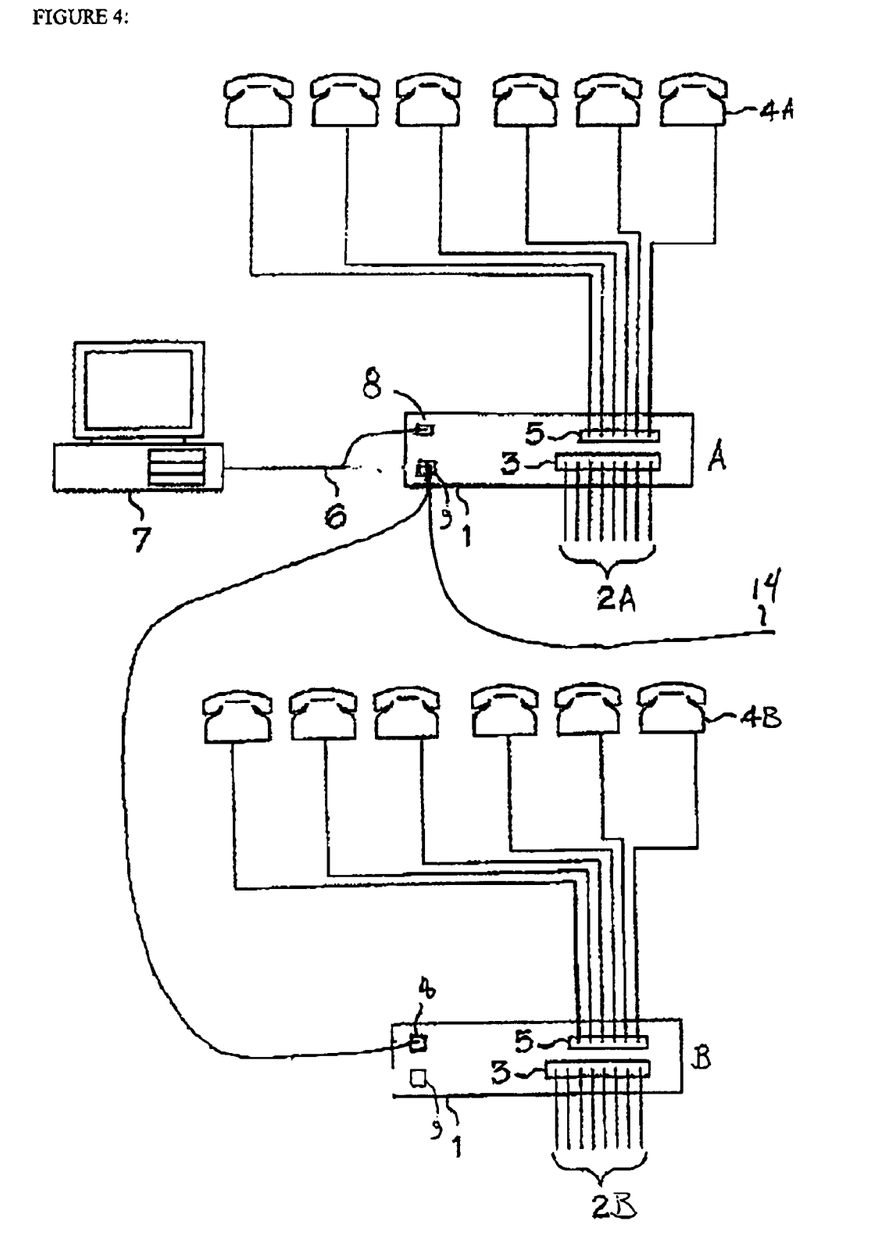
FIG. 4 shows two multiline dialing controllers of the present invention operatively connected to the same host computer and central database of telephone contact records.

FIG. 4 shows two of the expandable dialing controllers of the present invention connected to us in the same manner as in FIG. 3. However, connection 14 illustrates where another expandable dialing controller 1 can be connected in parallel with expandable dialing controller B.

Dependent upon the capacity of the data bus between the dialing controllers, and most applicably in situations where the actual hardware of the dialing controllers themselves insofar as the connection of telephone calls between subscriber lines and operator telephones was concerned was handled in a digital fashion rather than as analog hardware or circuitry, expansion of the capacity of the multiline dialing system of the present invention by the connection of expandable multiple dialing controllers 1 to each other by way of the capacity expansion interface 9 between the expandable dialing controllers 1 could be further expanded or optimized by the addition of more switching capabilities for telephone calls between expandable dialing controllers 1 in the chain, provided that the capacity expansion interface 9 was sufficient in capacity in speed to allow for this. Specifically, telephone calls made on one expandable dialing controller 1 could be connected to an available operator device 4 on another expandable dialing controller 1, and vice versa. On a conceptual level this would operate as follows.

FIG. 3 shows a plurality of expandable dialing controllers 1 in accordance with the present invention which are operatively connected together by way of capacity expansion interfaces 9. This Figure shows two such expandable multiline dialing controllers 1 connected to each other. The expandable dialing controllers 1 have been lettered A and B for reference purposes.

All of the expandable dialing controllers 1 are connected either directly, or indirectly by way of the capacity expansion interfaces 9, to a single central computer 7 hosting a central database of telephone contact records. The central computer 7 sends telephone dialing coordinates or other instructions to each of the expandable dialing controllers 1 in the chain, as each expandable dialing controller 1 should require further instructions or should have lines available on which to make additional outside telephone calls.

The outside subscriber service lines 2 on the first expandable dialing controller 1 have been designated in this Figure as 2A, and in the second expandable dialing controller 1 are lettered 2B. Similarly, the operator devices 4 connected to the first expandable dialing controller 1 are marked in this Figure as 4A, and the operator devices 4 connected to the second expandable dialing controller 1 labelled 4B for the time being for reference purposes.

The expanded functionality which is contemplated herein is the interconnection of telephone calls between outside subscriber service lines 2 on one expandable dialing controller 1 and internal operator devices 4 connected to another expandable dialing controller 1 in the chain.

Specifically, if an expandable dialing controller 1 in the chain for example had a connected telephone call that there was no operator device 4 available on that expandable dialing controller 1 to accept [for example, if the expandable dialing controller 1 was working in predictive dialing mode and the telephone calls currently connected on the expandable dialing controller 1 were taking longer than the average, the expandable dialing controller 1 might send a signal or seek out by way of the capacity expansion interface 9 connection between the expandable dialing controllers 1 in the chain to identify an operator device 4 which was connected to another expandable dialing controller 1 which was available at that time and then might connect the telephone call in question to that operator device 4 on the other expandable dialing controller 1 by routing the connection from the outside subscriber service line 2 in question over the capacity expansion interface 9 to the expandable dialing controller 1 which had an operator device 4 free, which operator device 4 would then be connected to the telephone call in question as the expandable dialing controller 1 to which that operator device 4 was connected would accept the provision of the data or signal stream for that particular outside telephone call over the capacity expansion interface 9 and allow it or render it connected to the available operator device 4.

In similar circumstances, where one expandable dialing controller 1 in the chain had one or more operator devices 4, free or available, and all of the outside subscriber service lines 2 on the expandable dialing controller 1 were currently tied up servicing other telephone calls on the system, that expandable dialing controller 1 might send out a signal or seek out by way of the capacity expansion interface 9 connection between the various expandable dialing controllers 1 in the chain, an expandable dialing controller 1 in the chain which had a free or available outside subscriber service line 2 and might effectively signal the availability of the operator device 4 and trigger the dialing of a new telephone call by that other expandable dialing controller 1 which had an available outside subscriber service line 2. When the call is connected, the call could then be connected internally, i.e. between the outside subscriber service line 2 connection of the one expandable dialing controller 1 and the operator device 4 connection of another expandable dialing controller 1, over the capacity expansion interface 9 connection between the expandable dialing controllers 1 in the chain.

To summarize the overall concept that it is contemplated to achieve with this embodiment is that calls made on lines 2A could be connected to operator devices 4B, and vice versa, if the appropriate capacity and technical parameters were met by the dialing controller interface 9.

The expandable dialing controllers themselves (A and B) in the Figures, might be technically capable of hunting for open lines or operator devices 4 on the other expandable dialing controllers 1 in the chain, or alternatively with attendant interface and software modifications the central computer 7 might coordinate this function. It will be understood that any such operation is contemplated within the scope of the present invention.

Again as outlined above will be understood that the specific nature or communications protocols used by the expandable dialing controllers 1, and the central computer 7, to communicate in the local network formed by the central computer 7 and the expandable dialing controllers 1 of the system of the present invention, provided that they enable the capability of firstly sharing a connection between all the expandable dialing controllers 1 and a single central computer 7, and then optionally also providing this interchangeable line capability between the expandable dialing controllers 1 in the chain, it will be understood that the precise nature of the communications between the various hardware nodes of that network might vary, and all such variations as might be contemplated by one skilled in the art are obviously intended to fall within the scope of the presently claimed invention.

In addition to the modular or expandable dialing controller 1 disclosed herein, the present invention also comprises an already expanded multiline dialing control system comprising a plurality of expandable dialing controllers 1 operatively connected to a single central computer 7 containing a single central database of telephone contact records for the administration of a telephone contact campaign using the dialing capabilities of all of the expandable dialing controllers 1 connected to that single central database. One method of connection of such expandable dialing controllers 1 might be in a daisy chain topology, as illustrated in FIG. 3, where in the central computer 7 and central database of telephone contact records is connected to the first expandable dialing controller 1 of the system and the second and subsequent expandable dialing controllers 1 are connected to the first expandable dialing controller 1 in serial daisy chain fashion using a dialer expansion interface 9 or connection between the expandable dialing controllers 1.

Each of the expandable dialing controllers 1 of this expanded multiline dialing control system would be connected to a plurality of operator devices 4, and a plurality of outside subscriber service lines 2. The basic embodiment of this multiline dialing control system would provided that the central computer 7 and central database of telephone contact records would provide dialing coordinates or other instructions to all of the expandable dialing controllers 1 in the system regarding the dialing of new telephone calls on the outside subscriber service lines 2. As a expandable multiline dialing controller 1 dialed such a call on one of its available outside subscriber service lines 2, it might then connect that call to a free operator device 4 on that same expandable dialing controller 1.

The particular method of connection of the expandable dialing controllers 1 to the single central computer 7 and central database of telephone contact records could, it will be understood, take many forms and any such form in terms of physical connection or the protocols used between the expandable dialing controllers 1 and the central computer 7 insofar as they accomplish the object of allowing the single central computer 7 to communicate and provide dialing instructions to all of the expandable dialing controllers 1 in the system are contemplated within the scope of the present invention.

In the expandable multiline dialing control system of the present invention, added functionality might be created by allowing for telephone calls dialed on outside subscriber service lines 2 of one expandable dialing controller 1 in the system to be connected to operator device 4 connected to another expandable dialing controller 1 in the system. It will be understood that all the necessary alterations to the capacity expansion interface 9 between the expandable dialing controllers 1 in the system to accomplish this object are also contemplated within the scope of the present invention.

The basic embodiment of the expandable multiline dialing control system of the present invention is a single central computer 7 connected to a plurality of expandable dialing controllers 1, each expandable dialing controller 1 being connected to a plurality of operator devices 4 and a plurality of outside subscriber service lines 2, wherein each of the expandable dialing controllers 1 in the system obtain their dialing instructions and coordinates from the same central database hosted in the central computer 7. In more elaborate embodiments of the system of the present invention telephone calls dialed on outside subscriber service lines 2 of one expandable dialing controller 1 in the system could be connected to operator devices 4 on another expandable dialing controller 1 in the system. This would allow for further optimization of staff resources within the call centre environment in which the system was employed.

Also disclosed is the method of administering a telephone contact campaign using either the expandable dialing controller 1 or the expandable multiline dialing control system as outlined herein.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. An expandable dialing controller, said expandable dialing controller being operably connectable to an outside subscriber service and to at least one operator device so that individual telephone calls can be originated on said outside subscriber service and connected to one of said operator devices, said expandable dialing controller comprising:
   a capacity expansion interface which is operably connectable to at least one additional dialing controller; and
   a database interface by which said expandable dialing controller can access a central database containing telephone dialing coordinates for telephone calls to be originated by said expandable dialing controller;
   wherein said expandable dialing controller can originate telephone calls to telephone dialing coordinates stored within the central database;
   and wherein upon connection of said expandable dialing controller to said at least one additional dialing controller via said capacity expansion interface, the expandable dialing controller and additional dialing controllers together comprising a group of dialing controllers, all of the dialing controllers in the group of dialing controllers will share access to the central database.

2. The expandable dialing controller of claim 1 wherein said database interface comprises a port which allows connection and access to a central database located on separate hardware.

3. The expandable dialing controller of claim 2 wherein said separate hardware comprises a central computer operably connectable to said expandable dialing controller.

4. The expandable dialing controller of claim 1 wherein the database interface comprises an integral connection, and the central database resides within said expandable dialing controller.

5. The expandable dialing controller of claim 4 wherein the central database is contained on a storage medium readable by said expandable dialing controller.

6. The expandable dialing controller of claim 1, wherein said database interface is capable of bidirectional transfer of data between said expandable dialing controller and said central database of telephone coordinates.

7. The expandable dialing controller of claim 3, wherein said expandable dialing controller is internally connected to said central computer and said at least one additional dialing controllers are externally connected to said expandable dialing controller through said capacity expansion interface.

8. The expandable dialing controller of claim 1, wherein said at least one additional dialing controller is operably connectable to said expandable dialing controller by a serial connection.

9. The expandable dialing controller of claim 8, wherein said serial connection is a daisy chain.

10. The expandable dialing controller of claim 1, wherein said at least one additional dialing controller is operably connected to said expandable dialing controller by a parallel connection.

11. The expandable dialing controller of claim 10, wherein said parallel connection is a hub.

12. The expandable dialing controller of claim 1, wherein upon connection of said expandable dialing controller to at least one additional dialing controller via the capacity expansion interface, said dialing controllers together being a group of dialing controllers, telephone calls originated on the outside subscriber service of one of said group of dialing controllers can be connected to an operator device connected to a different one of said group of dialing controllers.

13. The expandable dialing controller of claim 12 wherein said expandable dialing controller will seek out available outside subscriber service capacity on any of the group of dialing controllers when it is desired to originate a telephone call and the outside subscriber service of said expandable dialing controller is unavailable, and will originate the telephone call on an available subscriber service which is located on another of said dialing controllers of the group of dialing controllers.

14. The expandable dialing controller of claim 12 wherein said expandable dialing controller will seek out an available operator device connected to any of the group of dialing controllers when a telephone call is originated via the outside subscriber service attached to one of the dialing controllers and the operator devices attached to said one of the dialing controller are not available, and will connect said telephone call to said operator device which is located on another of said dialing controllers of the group of dialing controllers.

15. An expandable multiline dialing system comprising:
   a) a central database of prospect records, each said prospect record including telephone dialing coordinates for a telephone call to be completed;
   b) a plurality of operator devices;
   c) a first expandable dialing controller comprising a capacity expansion interface and a database interface, wherein said first expandable dialing controller is operably connected to said central database by said database interface, and is operably connected to a first outside subscriber service and to at least a first operator device; and
   d) at least one additional dialing controller which is operably connected via said capacity expansion interface to said first expandable dialing controller and is operably connected to a second outside subscriber service and to at least a second operator device;
   wherein said at least one additional dialing controller will share access to the central database via said capacity expansion interface;
   and wherein each dialing controller can originate telephone calls to telephone dialing coordinates stored within the central database.

16. The expandable multiline dialing system of claim 15 wherein said database interface comprises a port, which allows connection and access to a central database located on separate hardware.

17. The expandable multiline dialing system of claim 16 wherein said separate hardware comprises a central computer operably connected to said first expandable dialing controller.

18. The expandable multiline dialing system of claim 15 wherein the database interface comprises an integral connection, and the central database resides within said first expandable dialing controller.

19. The expandable multiline dialing system of claim 15 wherein said at least one additional dialing controller is a non-expandable dialing controller and comprises a database interface wherein said database interface of said non-expandable dialing controller is operably connected to the capacity expansion interface of said first expandable dialing controller and said non-expandable dialing controller will access the central database through said first expandable dialing controller.

20. The expandable multiline dialing system of claim 15 wherein said at least one additional dialing controller is a second expandable dialing controller and comprises a capacity expansion interface and a database interface, wherein said database interface of said second expandable dialing controller is operably connected to the capacity expansion interface of said first expandable dialing controller and will access the central database through said first expandable dialing controller.

21. The expandable multiline dialing system of claim 20 comprising a further dialing controller having a database interface operably connected to the capacity expansion interface of said second expandable dialing controller and wherein the further additional dialing controller will access the central database through said first and second expandable dialing controllers.

22. The expandable multiline dialing system of claim 15 comprising a plurality of additional expandable dialing controllers serially connected to said first expandable dialing controller such that a database interface of each additional expandable dialing controller is operably connected to the capacity expansion interface of a preceding additional dialing controller.

23. The expandable multiline dialing system of claim 15 wherein at least one additional dialing controllers is further directly connected to the central database.

24. The expandable multiline dialing system of claim 15 wherein at least one additional dialing controllers is operably connected to an additional database.

25. The expandable multiline dialing system of claim 15 wherein said database interface is capable of bidirectional transfer of data between said dialing controllers and said central database of telephone coordinates.

26. The expandable multiline dialing system of claim 15 wherein the central database is contained on a storage medium readable by said first expandable dialing controller.

27. The expandable multiline dialing system of claim 17, wherein said first expandable dialing controller is internally connected to said central computer and said at least one additional dialing controller is externally connected to said first expandable dialing controller through said capacity expansion interface.

28. The expandable multiline dialing system of claim 15, wherein said at least one additional dialing controller is operably connected to said first expandable dialing controller by a serial connection.

29. The expandable multiline dialing system of claim 28, wherein said serial connection is a daisy chain.

30. The expandable multiline dialing system of claim 15, wherein said at least one additional dialing controller is operably connected to said first expandable dialing controller by a parallel connection.

31. The expandable multiline dialing system of claim 30, wherein said parallel connection is a hub.

32. The expandable multiline dialing system of claim 15, wherein upon connection of said first expandable dialing controller to at least one additional dialing controller via the capacity expansion interface, said dialing controllers together being a group of dialing controllers, telephone calls originated on the outside subscriber service of one of said group of dialing controllers can be connected to an operator device connected to a different one of said group of dialing controllers.

33. The expandable multiline dialing system of claim 32 wherein said first expandable dialing controller can seek out available outside subscriber service capacity on any of the group of dialing controllers when it is desired to originate a telephone call and the outside subscriber service of said first expandable dialing controller is unavailable, and can originate the telephone call on an available subscriber service which is located on another of said dialing controllers of the group of dialing controllers.

34. The expandable multiline dialing system of claim 32 wherein said first expandable dialing controller can seek out an available operator device connected to any of the group of dialing controllers when a telephone call is originated via the outside subscriber service attached to one of the dialing controllers and the operator devices attached to said one of the dialing controller are not available, and can connect said telephone call to an operator device which is located on another of said dialing controllers of the group of dialing controllers.

35. A method of dialing an outgoing call in an expandable multiline dialing system, using telephone coordinates provided by a central database, said method comprising:

a) providing a first expandable dialing controller operably connected to an outside subscriber service and to said central database as well as to at least one operator device;

b) providing at least one additional dialing controller operably connected to an outside subscriber service as well as to at least one operator device and operably connected to said first expandable dialing controller;

c) the central database providing the telephone coordinates to the first expandable dialing controller;

d) the first expandable dialing controller originating the outgoing call using the telephone coordinates on an available outside subscriber service located on any of the dialing controllers; and e) operably connecting the outgoing call to one of the operator devices.

36. The method of 35 wherein the outgoing call is originated on an outside subscriber service located on one of the dialing controllers and the outgoing call is connected to one of the operator devices on a different dialing controller.

* * * * *